(12) United States Patent
Shah

(10) Patent No.: US 6,944,340 B1
(45) Date of Patent: Sep. 13, 2005

(54) METHOD AND APPARATUS FOR EFFICIENT DETERMINATION OF RECOGNITION PARAMETERS

(75) Inventor: Kishan B Shah, Mountain View, CA (US)

(73) Assignee: Canon Kabushiki Kaisha, Tokyo (JP)

(*) Notice: Subject to any disclaimer, the term of this patent is extended or adjusted under 35 U.S.C. 154(b) by 466 days.

(21) Appl. No.: 09/633,473

(22) Filed: Aug. 7, 2000

(51) Int. Cl.[7] ............................. G06K 9/00; G06K 9/20

(52) U.S. Cl. ..................................... 382/187; 382/321

(58) Field of Search ................................ 382/169, 170, 382/171, 172, 176, 181, 185, 186, 187, 188, 382/189, 229, 237, 321; 358/296, 462; 235/375

(56) References Cited

U.S. PATENT DOCUMENTS

| | | | | | |
|---|---|---|---|---|---|
| 5,050,222 A | * | 9/1991 | Lee | ............................ | 382/176 |
| 5,770,841 A | * | 6/1998 | Moed et al. | ................ | 235/375 |
| 5,867,277 A | * | 2/1999 | Melen et al. | ............... | 358/296 |
| 5,905,820 A | * | 5/1999 | Cushman et al. | ........... | 382/299 |
| 6,134,338 A | * | 10/2000 | Solberg et al. | ............. | 382/113 |

* cited by examiner

Primary Examiner—Mehrdad Dastouri
(74) Attorney, Agent, or Firm—Fitzpatrick, Cella, Harper & Scinto

(57) ABSTRACT

A method and apparatus creates a reduced-resolution version of an image and uses the reduced resolution version to identify recognition parameters. The recognition parameters are then used on the original version of the image to recognize objects such as characters in the image.

16 Claims, 3 Drawing Sheets

METHOD AND APPARATUS FOR EFFICIENT DETERMINATION OF RECOGNITION PARAMETERS

FIELD OF THE INVENTION

The present invention is related to computer software and more specifically to computer software for optical recognition of objects.

BACKGROUND OF THE INVENTION

Computer software can be used to recognize digital representations of objects. For example, optical character recognition software can be used to recognize digital representations of character objects, typically obtained by scanning a printed page, segmenting the page into characters, and identifying characteristics of each character. Rules are used to narrow the choice of characters to a smaller range of characters, and a confidence level is assigned to each character in the smaller range. The character with the highest confidence level may be selected as the recognized character.

Some computer software for object recognition uses parameters to allow the software to be adjusted. The use of parameters allows the software to be tuned in a laboratory to particular conditions simulating the environment of anticipated operation of the software. Before the software is shipped as part of a product, the parameters are fixed at a constant level that yielded the optimum recognition in the laboratory simulation for that product.

For example, if a scanned image represents the image using pixels, each having a greyscale value of 0–255, one parameter of the optical character recognition software may be to identify which values correspond to a part of the image to be recognized, in order to distinguish that part of the document from the greyscale value of the background. For example, a document received via a fax that is photocopied onto off-white paper may have text that has a greyscale reading of 200, while the remainder of the page may have a greyscale reading of 100. A printed black and white document may have a greyscale reading of 240 for text and 30 for the remainder of the page. Text on a printed color document may have a greyscale reading as low as 90 with a greyscale reading of 70 for portions of the background. These various values may be used to determine that an optimal cutoff greyscale reading of 150 should be used for the software. While this value provides a good compromise for high-contrast documents such as most black and white documents, certain color text on color background documents simply will not be recognized with this parameter value. If the parameter were lowered to 80 to accommodate recognition of color documents, some black and white documents would not be recognized, such as the fax photocopied onto off white paper.

It would be desirable to have the parameter selection process vary for each set of objects, such as characters on the page, rather than selecting a single value for each parameter and using that same value for all objects. This would allow the parameter values to change for every page or part of a page, causing the parameters to be optimized for every circumstance. In the example above, it would be desirable to use a greyscale threshold of 150 for the faxed document and a threshold of 80 for the color document, instead of using a value of 150 every time.

While it is possible to make several attempts at recognizing the objects, such as characters in the file, using different parameters for each attempt, and then selecting the attempt that yields the highest recognition confidence, such a process would add too much time to the recognition process to be practical. Although computing power increases every year, because users prefer to use the additional computing power to process images of higher resolution rather than improve the accuracy of the recognition, making several attempts at recognizing an image could take too long to be useful.

What is needed is a method and apparatus that can optimally set the parameters of an optical recognition without significantly adding time to the recognition.

SUMMARY OF INVENTION

A method and apparatus receives a digitized representation of an image at a first resolution, then produces a lower resolution version of the image. The method and apparatus then attempts multiple recognitions on the reduced-resolution version of the image using different parameters for each recognition and records the confidence level of the attempt. The parameters that yielded the highest confidence level on the attempt using the lower resolution version can then be used to perform the recognition on the higher-resolution version of the image.

DETAILED DESCRIPTION OF A PREFERRED EMBODIMENT

Figure 1:
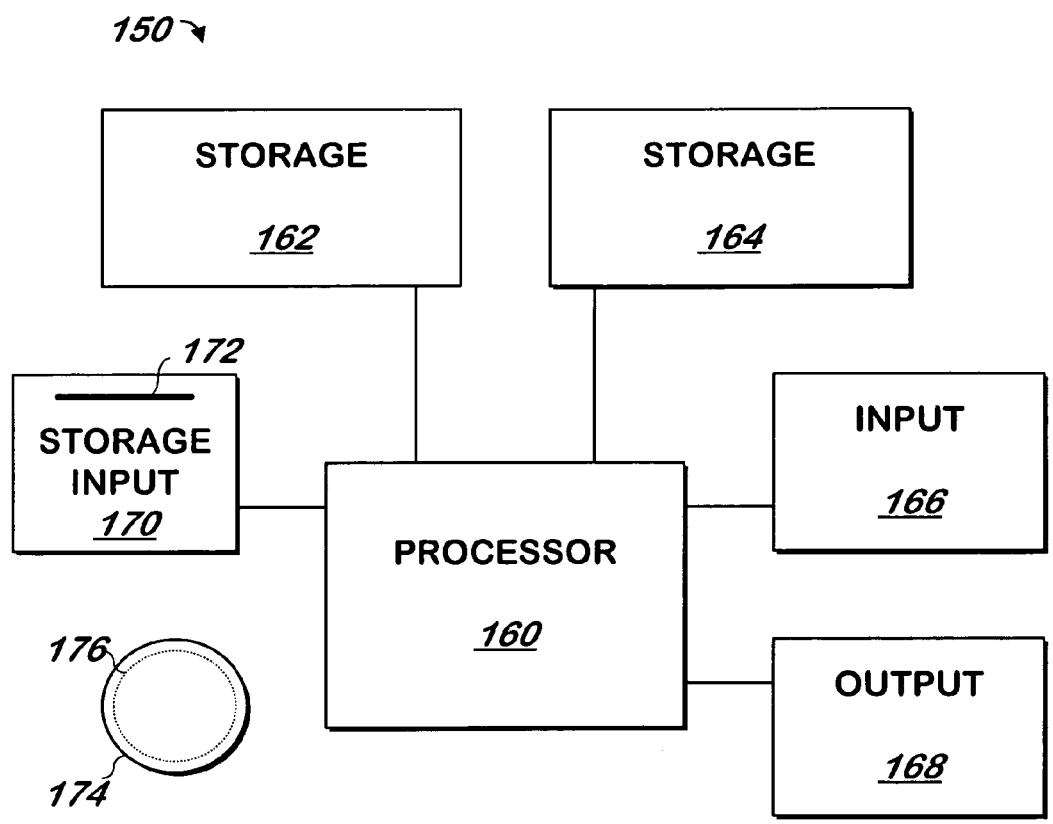
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard, mouse, scanner, digital camera or any or all of these allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional Intel Pentium/Celeron compatible computer such as the model 6540C commercially available from Hewlett Packard Corporation of Palo Alto, Calif., running the Windows operating system commercially available from Microsoft Corporation of Redmond Wash., although other systems may be used.

Figure 2:
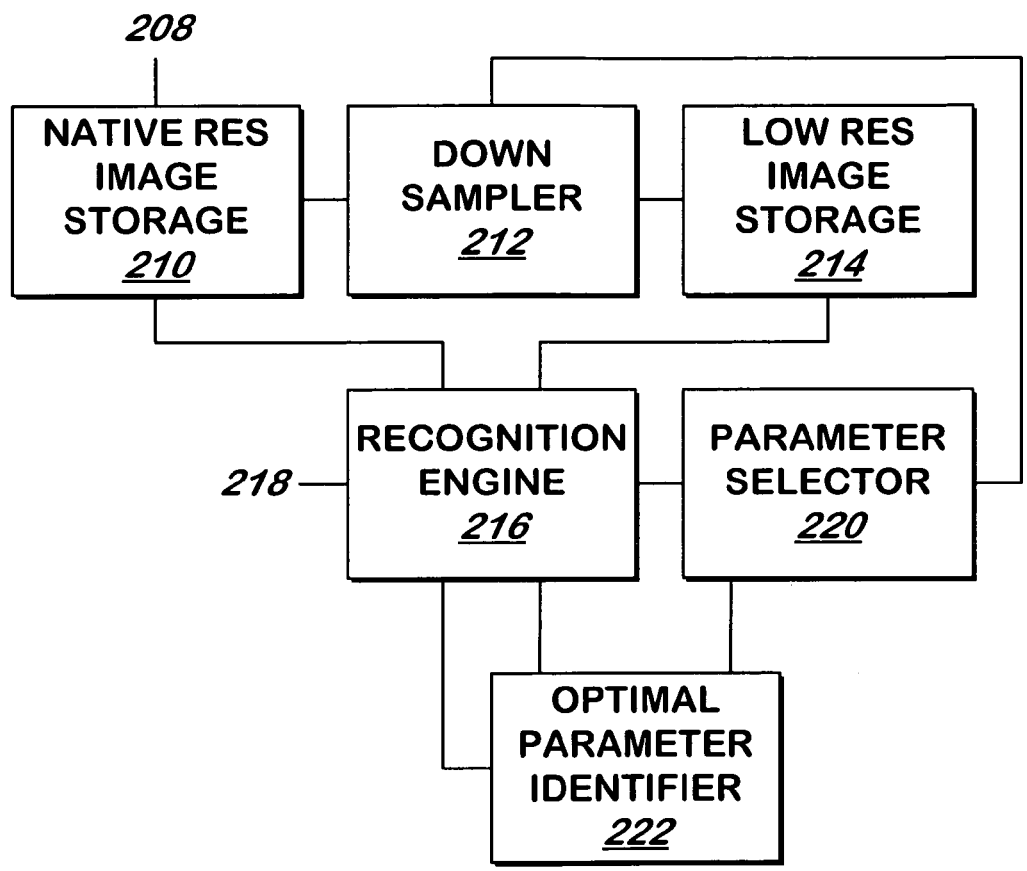
FIG. 2 is a block schematic diagram of a system for identifying optimal parameters for optical object recognition according to one embodiment of the present invention.

Referring now to FIG. 2 a system for identifying optimal parameters for optical object recognition is shown according to one embodiment of the present invention. The description below uses characters as the objects, however, objects can be shapes, people, three-dimensional items or any other object. Native resolution image storage 210 receives at input 208 a digitized representation of an image from an optical scanning device such as a scanner or digital camera at input 208. Native resolution image contains conventional memory such as random access memory or other types of storage and stores the digitized representation of the image in this storage. As native resolution image storage 210 receives an image, it signals downsampler 212.

In one embodiment, the digitized representation of the image stored in native resolution image storage 210 is made up of an array of pixels at a spatial resolution. For example, the digitized representation of the image may be represented with a resolution of 1200×1200 pixels per inch. Thus, an 8.5 by 11 inch document may be represented by 134,640,000 pixels. The digitized representation of the image may be stored using conventional compression techniques, so the number of pixels stored in native resolution image storage 210 may be less than the 134,640,000 pixels for that size document, even though that many pixels are represented by the digitized representation of the image. Each of the pixels may have one or more values. A greyscale image may have a greyscale value. A color image may have a pair of values: one representing luminance or intensity, and another value representing chromiance or color.

Downsampler 122 retrieves the digitized representation of the image from native resolution image storage 210, reduces the spatial resolution, and stores the result into low resolution image storage 214. Downsampler 212 reduces the spatial resolution by selecting a set of pixels, computing an average representation of the value or values of the pixels in the set, and then representing the entire set of pixels selected by a single pixel (or a number of pixels fewer than the number of pixels in the set) having the average value or values of the set of pixels selected. If the digitized representation of the image is compressed, downsampler 212 decompresses the image before reducing the resolution and may optionally compress the result prior to storage into low resolution image storage 214.

For example, if the resolution is 1200 dpi and it is desired to reduce the resolution to 300 dpi, downsampler 212 selects from native resolution image storage 210 a set of sixteen pixels from the upper left hand corner of the image, four pixel columns wide and four pixel rows tall, and averages the values from these pixels to produce a single pixel, which is output to low resolution image storage 214. Low resolution image storage 214 contains conventional storage such as memory or disk storage. The four pixels adjacent to these in each of the same four rows are selected and the process is repeated by downsampler 212 and so on until the end of the row is reached. When the end of the row is reached, downsampler 212 selects the next four rows and repeats the process described above for these rows. It isn't necessary to proceed step-by-step in this fashion, nor is it necessary to average the values. For example, the values may be smoothed using conventional smoothing techniques. When downsampler 212 has completed reducing the resolution of the digitized representation of the image, downsampler 212 signals parameter selector 220.

Parameter selector 220 selects an initial set of one or more parameters and passes them to recognition engine 216. Recognition engine is any conventional recognition engine such as an optical character recognition engine that can accept a set of parameters, identify a segment of an image, and provide the one or more characters recognized at the highest confidence level and also supply that confidence level, which may be a value between 0 and 1. Recognition engine 216 performs conventional optical character recognition techniques using the parameters provided by parameter selector 220 on the reduced resolution version of the digitized representation of the image that is stored in low resolution image storage 214. In one embodiment, recognition engine 216 segments the image into characters or words and then attempts to recognize the character or word using conventional optical character resolution techniques on each segment. Optical character recognition is described in Bunke & Wang, ed., *Handbook of Character Recognition and Document Image Analysis* (1997 World Scientific Publishing Co. Pte. Ltd, Singapore, ISBN 981-02-2270-X). Other forms of object recognition may also be used such as handwriting recognition, described in S Impedoio and J Simon, eds. From *Pixels to Features III*" (1992 Elsevier Science Publishers, B. V., Amsterdam). Source code for an optical character recognition engine is publicly available from the National Institute of Standards and Technology, Gaithersburg, Md., 20899 and is described in Garris et al, "Public Domain Optical Character Recognition", *Proceedings, SPIE* Volume 2422, pp 2–15, and this engine may be suitably modified as described herein.

Parameter selector 220 selects another set of parameters and passes them to recognition engine 216 and signals recognition engine to repeat the recognition process described above on the same segment of the image it just processed, and recognition engine 216 complies with the request. This process may be repeated a number of times, each time with a different set of parameters.

In one embodiment, each time another set of parameters is selected and provided by parameter selector 220, the value of only one of the parameters is varied until several different values of that parameter have been selected and provided to recognition engine 216 by parameter selector 220. When all possible values of that parameter have been provided or when an acceptable value has been identified, that parameter is set to a particular value and the value of a different parameter is varied, and so forth until all the parameters have been varied.

For example, assume two parameters, parameter 1 and parameter 2, with possible values of A1, B1, C1 and D1 for parameter 1 and values A2 and B2 for parameter 2. The sets of parameters provided by parameter selector 220 could be (A1, A2), (B1, A2), (C1, A2), (D1, A2), (A1, B2), (B1, B2), (C1, B2), (D1, B2).

It is not necessary to provide all possible values: for example, a binary search technique may be used or a discrete set of parameter combinations may be provided with multiple parameters changing from one set of parameters to the next. For example, the parameter values provided by parameter selector 220 could be limited to (A1, A2), (B1, B2), (C1, A2), (D1, B2).

Each time the parameters are provided to recognition engine, parameter selector 220 provides those parameters or an indicator of the parameters to optimal parameter identifier 222. In addition, recognition engine provides the confidence level of the character recognition to optimal parameter identifier. Optimal parameter identifier 222 records the parameters and the confidence level so that the optimal value for the parameters may be identified by selecting values of parameters that yield the highest confidence levels.

In one embodiment, optimal parameter identifier identifies the optimal value for a parameter by choosing the value of a parameter that yielded the highest confidence level for the recognition performed by recognition engine 216. In another embodiment, if the confidence level exceeds a threshold, such as 0.95, optimal parameter identifier 222 signals parameter selector 220 to select no further values of that parameter. This way, if an acceptable value is reached, the system 200 does not continue searching for a better one: the acceptable value is used as the optimal value.

In one embodiment, when an optimal value for a particular parameter has been identified, optimal parameter identifier 222 provides the value of the optimal parameter to parameter selector 220 to use in all remaining parameter selections it makes as described above. In another embodiment, a preset value may be used in place of the optimal parameter for use in attempting to identify the optimal value of a different parameter.

When the optimal values of all of the parameters have been identified as described above, optimal parameter identifier 222 signals recognition engine with the optimal values of all parameters. Recognition engine 216 selects the segment of the digitized representation of the image in native resolution image storage 210 that corresponds to the segment in low resolution image storage 214 that was used to select the optimal parameters and performs an optical character recognition of the segment from native resolution image storage 210. In one embodiment, recognition engine 216 uses the same character recognition techniques that it used on the lower resolution version of the image to recognize the higher resolution version of the image. In another embodiment, a different character recognition is used for the different resolution versions of the image. In one embodiment, when recognition engine completes the optical character recognition of the higher resolution image, it outputs at output 218 a representation of the object or objects recognized and signals parameter selector 220 so that the process may be repeated on a different segment of the image. The representation of the object or objects recognized may be an ASCII character as well as font descriptions and the like or may be a code for a particular object, such as a rubber band or a circle. In another embodiment, recognition engine 216 attempts to recognize the next segment from native resolution image storage 210 using the same parameters as the last segment, and only signals parameter selector 220 to begin the process of parameter selection again if the confidence level of the recognition for the segment falls significantly below the confidence level of the last recognition or falls below a certain preset value.

Figure 3:
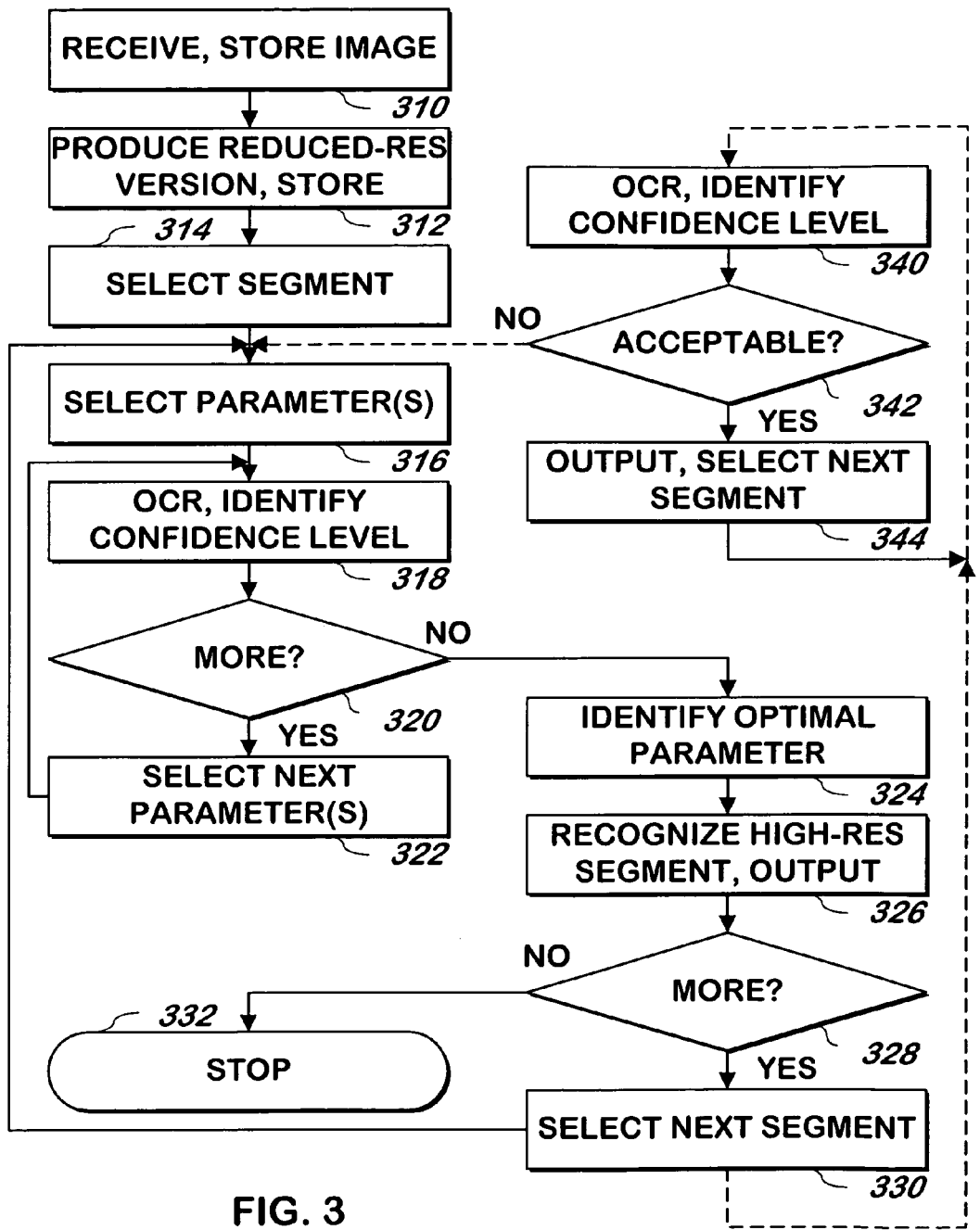
FIG. 3 is a flowchart illustrating a method of identifying optimal parameters for optical object recognition according to one embodiment of the present invention.

Referring now to FIG. 3, a method of identifying optimal parameters for optical object recognition is shown according to one embodiment of the present invention. The description below uses characters as objects, but an object may also be noncharacter things as described above. An digital representation of an image is received and stored 310 at a first resolution, such as a native resolution of a scanning device as described above. A reduced-resolution version of some or all of the image received in step 310 is produced and stored 312 as described above. A segment is selected 314, either from the image received in step 310 or the version of the image produced in step 312. An initial set of parameters are selected 316 as described above. An attempt is made to recognize one or more objects such as characters in the segment from the reduced resolution version of the image, and the highest confidence level obtained from the attempt is produced 318. If there are additional combinations of parameters 320, a different combination is selected as described above 322 and the method continues at step 318 using the different combination of parameters. When the selection and testing the recognition from the combinations of parameters is completed as described above 320, the optimal parameters are identified 324 as described above. The segment of the image received in step 310 is then recognized using the optimal parameters 326 and the character or characters recognized from the segment of the image received in step 310 are output 326. If there are more segments 328, the next segment is selected 330 and the method continues at step 316 using the selected segment, and otherwise, the method terminates 332.

In an alternate embodiment of the present invention illustrated by the dashed lines in the figure, when the next segment is selected at step 330, instead of continuing at step 316, the method continues at step 340. At step 340, the segment from the digitized representation of the image received in step 310 is recognized and a confidence level is identified. If the confidence level is acceptable as described above 342, the character or characters recognized in step 340 are output and the next segment is selected 344, and the method continues at step 340. Otherwise 342, the method continues at step 316 to identify values of parameters to use for the segment on which the recognition was attempted in step 340 but acceptable recognition confidence was not achieved.

What is claimed is:

1. A method of optical character recognition (OCR) of a character image the method comprising the steps of:

receiving the character image represented at a first spatial resolution;

creating a reduced-resolution version of the character image received in said receiving step, the reduced-resolution version of the character image being represented at a second spatial resolution lower than the first spatial resolution;

executing OCR processing on the reduced resolution version of the character image represented at the second spatial resolution so as to identify an optimal OCR parameter for OCR processing of the character image represented at the first spatial resolution; and OCR processing the character image represented at the first spatial resolution utilizing the optimal OCR parameter identified in said executing step so as to acquire a character code corresponding to the character image.

2. The method according to claim 1, wherein said executing step identifies the optimal OCR parameter according to steps comprising:

providing a plurality of sets of at least one parameter;

executing OCR processing on the reduced-resolution version of the character image with each set of the at least one parameter so as to identify each confidence level of character-recognition; and selecting the optimal OCR parameter based on the confidence levels identified.

3. The method according to claim 2, wherein said selecting step comprises selecting the optimal OCR parameter corresponding to a highest confidence level from a plurality of the confidence levels identified.

4. The method according to claim 2, wherein said selecting step comprises selecting the optimal OCR parameter corresponding to a confidence level exceeding a threshold.

5. The method according to claim 1, wherein said creating step creates the reduced-resolution version of the character image by calculating an average of at least one value of a plurality of pixels of the character image represented at the first spatial resolution.

6. The method according to claim 1, further comprising the steps of:
- judging whether a confidence level of character recognition by said OCR processing step is acceptable; and
- repeating said executing step and said OCR processing step if the confidence level is not acceptable.

7. A computer program product comprising a computer usable medium having computer executable program code embodied therein for optical character recognition (OCR) for a character image, the computer program product comprising computer executable program code configured to:
- receive the character image represented at a first spatial resolution;
- create a reduced-resolution version of the character image received in said receiving step, the reduced-resolution version of the character image being represented at a second spatial resolution lower than the first spatial resolution;
- execute OCR processing on the reduced resolution version of the character image represented at the second spatial resolution so as to identify an optimal OCR parameter for OCR processing of the character image represented at the first spatial resolution; and
- OCR process the character image represented at the first spatial resolution utilizing the optimal OCR parameter identified in said execution step so as to acquire a character code corresponding to the character image.

8. The computer program product according to claim 7, wherein said computer executable program code configured to execute OCR processing so as to identify an optimal OCR parameter is further configured to:
- provide a plurality of sets of values of at least one parameter;
- execute OCR processing on the reduced-resolution version of the character image with each set of the at least one parameter so as to identify each confidence level of character-recognition; and
- select the optimal OCR parameter based on the confidence levels identified.

9. The computer program product according to claim 8, wherein said computer executable program code configured to select is further configured to select the optimal OCR parameter corresponding to a highest confidence level from a plurality of the confidence levels identified.

10. The computer program product according to claim 8, wherein said computer executable program code configured to select is further configured to select the optimal OCR parameter corresponding to a confidence level exceeding a threshold.

11. The computer program product according to claim 7, wherein said computer executable program code configured to create is further configured to create the reduced-resolution version of the character image by calculating an average of at least one value of a plurality of pixels of the character image represented at the first spatial resolution.

12. The computer program product according to claim 7, further comprising computer executable program code configured to:
- judge whether a confidence level of character recognition is acceptable; and
- repeat said execution step and said OCR processing step if the confidence level is not acceptable.

13. A system for optical character recognition (OCR) for a character image, the system comprising:
- a downsampler having an input for receiving the character image represented at a first spatial resolution, the downsampler for producing and providing at an output thereof a reduced-resolution version of the character image responsive to the first spatial resolution representation of the character image received at the downsampler input, the reduced resolution version of the character image being represented at a second spatial resolution lower than the first spatial resolution; and
- a character-recognition engine for optical character recognition (OCR) processing of an image, said character-recognition engine having a first input coupled to the downsampler output for receiving the reduced-resolution version of the character image and a second input for receiving the character image represented at the first spatial resolution, the character-recognition engine being constructed to:
- execute OCR processing on the reduced resolution version of the character image represented at the second spatial resolution received at the first input so as to identify an optimal OCR parameter for OCR processing of the character image represented at the first spatial resolution;
- OCR process the character image received at the second input utilizing the optimal OCR parameter identified in said execution step so as to acquire a character code corresponding to the character image, and
- provide the acquired character code at a first output coupled to a system output.

14. The system according to claim 13, wherein the character-recognition engine identifies the optimal OCR parameter by executing OCR processing on the reduced resolution version of the character image with each set in a plurality of sets of parameters.

15. The system according to claim 14,
- wherein the character-recognition engine performs character-recognition responsive to each set in the plurality of sets of parameters and provides a corresponding recognition confidence level for each of the sets; and
- wherein the system further comprises a parameter identifier having a first input for receiving the recognition confidence level for each of the sets, and a second input for receiving each set in the plurality of sets of parameters, the parameter identifier for selecting and providing at an output thereof each set of parameters and its corresponding recognition confidence level.

16. The system according to claim 15, wherein the parameter identifier selects an additional set or parameters responsive to a threshold confidence level.

* * * * *

UNITED STATES PATENT AND TRADEMARK OFFICE
CERTIFICATE OF CORRECTION

PATENT NO. : 6,944,340 B1
DATED : September 13, 2005
INVENTOR(S) : Kishan B. Shah It is certified that error appears in the above-identified patent and that said Letters Patent is hereby corrected as shown below:

Column 1,
Line 51, "parameter" should read -- parameters --.

Column 3,
Line 40, "Downsampler 122" should read -- Downsample 212 --.

Column 4,
Line 29, "From *Pixels to Features*" should read -- *From Pixels to Features* --.

Column 6,
Line 38, "image" should read -- image, --.

Column 8,
Line 38, "image," should read -- image; --; and
Line 59, "or" should read -- of --.

Signed and Sealed this

Third Day of January, 2006

JON W. DUDAS
*Director of the United States Patent and Trademark Office*